United States Patent [19]

Natsunaga

[11] Patent Number: 5,548,423
[45] Date of Patent: Aug. 20, 1996

[54] COLOR LIQUID–CRYSTAL SHUTTER ARRAY HAVING UNIQUE PIXEL ARRANGEMENT AND METHOD OF DRIVING THE SAME

[75] Inventor: Masaaki Natsunaga, Sayama, Japan

[73] Assignee: Citizen Watch Co., Ltd., Tokyo, Japan

[21] Appl. No.: 165,703

[22] Filed: Dec. 13, 1993

[30] Foreign Application Priority Data

Dec. 15, 1992 [JP] Japan .................................... 4-353771
Jan. 26, 1993 [JP] Japan .................................... 5-028448

[51] Int. Cl.$^6$ ........................ G02F 1/1335; G02F 1/1343; G09G 3/36
[52] U.S. Cl. ................................ 359/68; 359/61; 359/55; 345/94; 345/208
[58] Field of Search ................................ 359/61, 68, 55, 359/56; 345/87, 94, 208

[56] References Cited

U.S. PATENT DOCUMENTS

| | | | |
|---|---|---|---|
| 4,231,640 | 11/1980 | Funada | 350/336 |
| 4,335,936 | 6/1982 | Nonomura | 350/336 |
| 4,818,981 | 4/1989 | Oki | 345/94 |
| 4,844,569 | 7/1989 | Wada | 359/63 |
| 4,920,409 | 4/1990 | Yamagishi | 359/55 |
| 5,047,789 | 9/1991 | Kanayama | 359/68 |
| 5,206,673 | 4/1993 | Kawahara | 359/63 |

FOREIGN PATENT DOCUMENTS

| | | | |
|---|---|---|---|
| 0207118 | 10/1985 | Japan | 359/61 |
| 0061233 | 3/1988 | Japan | 359/56 |
| 3010215 | 1/1991 | Japan | 345/94 |
| 2278223 | 11/1994 | Japan | 345/87 |
| 2075738 | 11/1981 | United Kingdom | 345/94 |

OTHER PUBLICATIONS

Japanese Unexamined Utility Model Application (KOKAI) No. 61–125453 Aug. 7, 1986 Myoshi.
Japanese Unexamined Patent Application (KOKAI) No. 62–134624 Jun. 17, 1987 Konishi.
Japanese Uexamined Patent Application (KOKAI) No. 62–150330 Jul. 4, 1987 Shioji.

*Primary Examiner*—Anita Pellman Gross
*Assistant Examiner*—Tiep H. Nguyen
*Attorney, Agent, or Firm*—Finnegan, Henderson, Farabow, Garrett and Dunner

[57] ABSTRACT

A method of driving positive-type super-twisted nematic liquid crystal shutters by using a low-voltage CMOS-LSI maintaining a contrast ratio of greater than 100 without being colored. When an inter-electrode voltage at which the color of the liquid crystal pixels constituting the liquid crystal shutters starts to extinguish is denoted by VL and an inter-electrode voltage that minimizes the transmission factor of the liquid crystal pixels is denoted by VM, a peak value of the AC voltage applied to the opposing electrode is set to be (VL+VM)/2, and a peak value of the AC voltage applied to the signal electrodes is set to be (VL−VM)/2. The AC voltage applied to the opposing electrode and the AC voltage applied to the signal electrodes are set to be in phase with each other to select a bright level and are inverted relative to each other in phase to select a dark level.

8 Claims, 7 Drawing Sheets

Fig.1
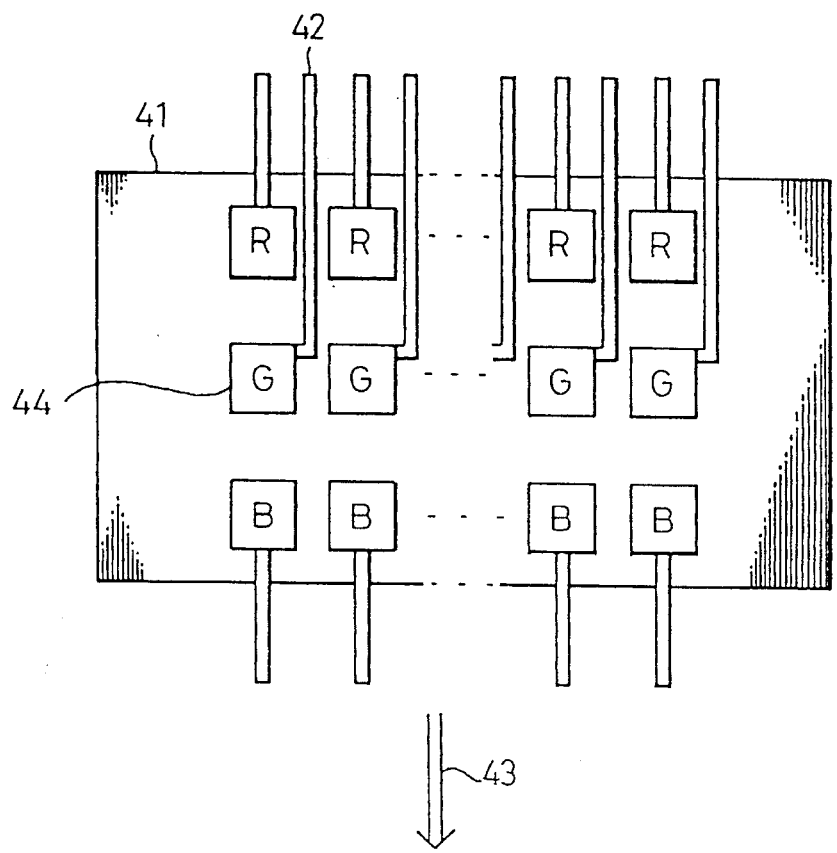
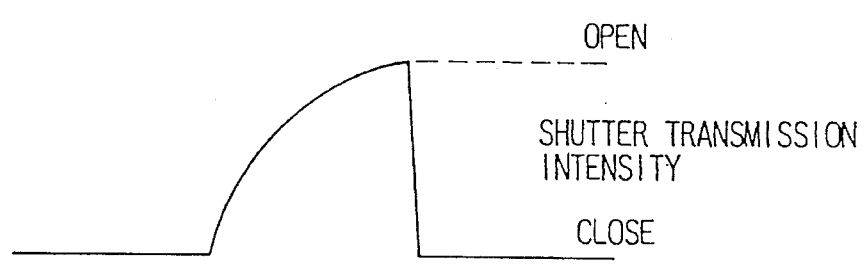
Fig.2A
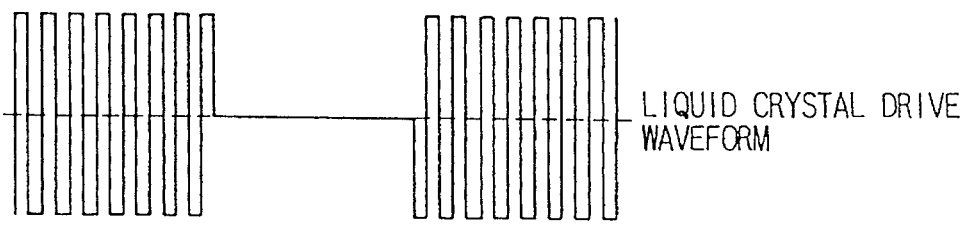
Fig.2B
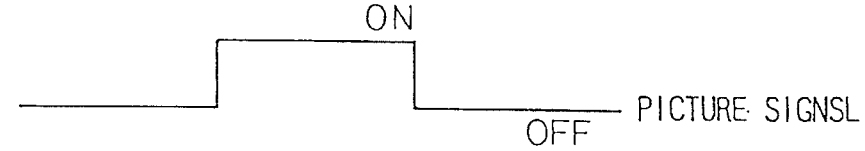
Fig.2C

COLOR LIQUID–CRYSTAL SHUTTER ARRAY HAVING UNIQUE PIXEL ARRANGEMENT AND METHOD OF DRIVING THE SAME

BACKGROUND OF THE INVENTION

1. Field of the Invention

The present invention relates to a liquid crystal shutter array used for optical printers and, more specifically, to a color liquid crystal shutter array that makes it possible to effect full-color printing onto photosensitive papers. The invention further relates to a method of driving the liquid crystal shutters in a liquid crystal optical printer which optically writes pictures onto photosensitive papers and photosensitive materials.

2. Description of the Related Art

The liquid crystal shutter array is a device in which a plurality of liquid crystal pixels arranged in a row or in a plurality of rows are turned on and off to control the transmission of light through each of the pixels. A method of full-color printing of a picture onto a photosensitive paper by using the liquid crystal shutter array has been disclosed in, for example, Japanese Unexamined Patent Publication (Kokai) No. 62-134624. According to this method, the full-color picture is formed on a photosensitive paper by utilizing a combination of a rotary plate on which are mounted a white-and-black liquid crystal shutter array and red-color, green-color and blue-color filters, and which is rotated by a motor, and an irradiation device which selectively emits red light, green light and blue light.

However, this method requires a rotary exposure system which separates and selects white light into color light, and an increased number of parts make the color printer bulky. Moreover, the timing for opening and closing the liquid crystal shutter pixels must be brought into agreement with the motion of the photosensitive paper that intermittently changes the rotating period of the rotary exposure device, making it difficult to obtain a full-color picture having good precision.

According to a method disclosed in Japanese Unexamined Utility Model Publication No. 61-125453, on the other hand, red-color, green-color and blue-color filters are provided for each of the rows of pixels of a liquid crystal shutter array that has a plurality of rows of pixels, and the lights that have passed through the filters having different hues are successively projected in an overlapping manner onto a photosensitive paper that moves at a constant speed perpendicularly to the rows of pixels, in order to obtain a picture in full color. This method is considered to be very helpful in reducing the size of a color printer.

According to the liquid crystal shutter array disclosed in the above publication, in which matrix pixels formed by many signal electrodes that intersect the electrodes of three rows are driven in a multiplexed manner, however, the quality of the printed picture is deteriorated due to a decrease in the contrast ratio of the pixels; and an increased period of printing time is required due to a decrease in the response speed, thus deteriorating the characteristics of the color printer.

A driving method which enables the liquid crystal shutter elements to exhibit their characteristics to a maximum degree, in regard to contrast ratio and response speed, can be represented by a static driving method which drives the pixels independently of each other. This method makes it possible to print a color picture of high quality on a photosensitive paper.

However, when it is attempted to apply this static driving method to the color liquid crystal shutter array having rows of red, green and blue pixels, wiring space must be maintained among the red pixels (R) in the color liquid crystal shutter array 41 to run lead electrodes 42 that are drawn from the pixels 44 of green color (G) as shown in FIG. 1. Therefore, the space portions among the neighboring pixels are not exposed by any of the pixels and, hence, the picture that is formed contains a number of stripes in parallel with a direction 43 in which the color liquid crystal shutter array moves, causing the quality of the printed picture to be greatly deteriorated.

On the other hand, the liquid crystal optical printers that have been developed or put into practice thus far, are all monochromatic hard copy printers without gradation to compete with laser printers and LED printers, and importance has been placed chiefly on high-speed performance.

Here, when it is attempted to copy a colored and gradated picture such as a photo picture or a TV picture by using a liquid crystal optical printer, the liquid crystal shutters which are principal constituent elements must have a contrast which is as high as 100 or more and must further have gradation. For this purpose, the amount of light transmitting through each pixel of the liquid crystal shutter per unit time must be controlled depending upon the picture input signal.

A method of solving the above-mentioned problem has been disclosed in Japanese Unexamined Patent Publication No. 62-150330. FIGS. 2(a) to 2(c) are diagrams which explain this method. The liquid crystal shutter to be driven is a positive-type twisted nematic liquid crystal shutter constituted by a liquid crystal cell of twisted nematic liquid crystal sandwiched by a pair of glass substrates with a transparent electrode, which is further sandwiched by a pair of polarizer plates which are so arranged that the axes of absorption intersect at right angles with each other. An AC rectangular liquid crystal drive wave shown in FIG. 2(b) based on a picture signal of FIG. 2(c) is applied to the transparent electrodes of the liquid crystal shutter. As a result, shutter transmission intensity characteristics are obtained as shown in FIG. 2(a). According to this method, the light is usually shut off by applying a voltage, and the application of voltage is interrupted when a picture signal is input permitting the light to pass through, to thereby control the amount of light transmission.

Through experiments, however, the inventors have learned that the above-mentioned driving method is not really capable of offering a sufficient contrast ratio. Usually, the liquid crystal shutter array for printing pictures has nearly 1000 signal electrodes and is generally driven by a CMOS-LSI from the viewpoint of decreasing both the size of the module that is mounted, and the cost. However, CMOS-LSI has a driving voltage of about 15 volts at the greatest. When the 240 degree-twisted positive-type liquid crystal shutters were driven with this voltage, however, the obtained contrast ratio was about 60 degrees though it may vary depending upon the liquid crystal materials. A picture of satisfactory quality was not obtained even when the color picture was written on a Polaroid 669 instant film with the above-mentioned contrast ratio.

Moreover, the ordinary super-twisted nematic liquid crystal element is colored yellow since it produces a display by utilizing the effect of double refraction. Therefore, it becomes very difficult to print a vivid full-color picture by using the above-mentioned liquid crystal elements.

SUMMARY OF THE INVENTION

It is therefore a first object of the present invention to provide a color liquid crystal shutter array which is capable of printing a picture of high quality without stripes within a short period of time, and of realizing a compactly constituted color printing device by solving the problems mentioned above.

A second object of the present invention is to provide a method of driving a positive-type super-twisted nematic liquid crystal shutter array which offers a contrast ratio higher than 100 without being colored, even when it is driven by a low-voltage CMOS-LSI, in order to realize a compact color liquid crystal printing head of a reduced cost which effects a vivid full-color printing onto a photosensitive paper, such as an instant film, within short periods of time.

In order to accomplish the above-mentioned first object, the present invention deals with a color liquid crystal shutter array which has color pixels of a plurality of colors constituted by liquid crystal elements and optically writes a picture onto a photosensitive paper, wherein the pixels are arranged in two rows for each of the colors in a direction at right angles to the direction in which the photosensitive paper moves, the pixels of each of the rows being spaced apart maintaining a pitch equal to the size of the pixel, the rows of pixels of the same color being deviated by one pitch relative to each other in the direction in which the pixels are arranged, and lead electrodes of the pixels are drawn in the direction in which the photosensitive paper moves running through the gaps.

According to the above-mentioned constitution of the present invention, the pixels in each of the rows are arranged maintaining a gap of one pixel. However, since the pixels are arranged in two rows for each of the colors, the optical writing of two times makes it possible to write picture without a gap among the pixels as is the case of one row. Moreover, since the pixels are arranged maintaining a gap equal to the pixel, the lead electrodes of the pixels can be drawn by utilizing the gaps. This makes it possible to almost eliminate the stripes that developed when the picture was printed on the photosensitive paper by using the existing color liquid crystal shutter array. Moreover, a picture of a high quality can be obtained since it is a static color shutter array.

In order to accomplish the above-mentioned second object, furthermore, the present invention deals with a method of driving a liquid crystal shutter array which controls the amount of light that transmits through the liquid crystal pixels by applying an AC voltage to an opposing electrode of positive-type super-twisted nematic liquid crystal cells and to signal electrodes, wherein, when an inter-electrode voltage at which the color of the liquid crystal pixels starts to be extinguished is denoted by VL and an inter-electrode voltage that minimizes the transmission factor of the liquid crystal pixels is denoted by VM, a peak value of the AC voltage applied to either the opposing electrode or the signal electrodes is set to be (VL+VM)/2, a peak value of the AC voltage applied to the other electrode is set to be (VL−VM)/2, and the AC voltage applied to the opposing electrode and the AC voltage applied to the signal electrodes are set to be in phase with each other to select a bright level, and are inverted relative to each other in phase to select a dark level.

According to the method of driving the color liquid crystal shutter array having the above-mentioned constitution of the present invention, the color printing maintaining vivid hue can be accomplished by driving the color liquid crystal shutter array by applying an electrode voltage which efficiently utilizes colorless regions of the positive-type super-twisted nematic liquid crystal cells, and applying an electrode voltage of a level which does not destroy a drive circuit consisting of LSI, or the like, that drives the liquid crystal cells.

BRIEF DESCRIPTION OF THE DRAWINGS

FIG. 1 is a schematic plan view illustrating the arrangement of pixels in a conventional color liquid crystal shutter array and the arrangement of lead electrodes drawn from the pixels;

FIGS. 2(a) to 2(c) are diagrams explaining the method of driving a conventional liquid crystal shutter;

DETAILED DESCRIPTION OF THE PREFERRED EMBODIMENTS

The structure of the color liquid crystal shutter array according to the present invention and its driving method will now be described in detail in conjunction with the drawings.

Figure 3:
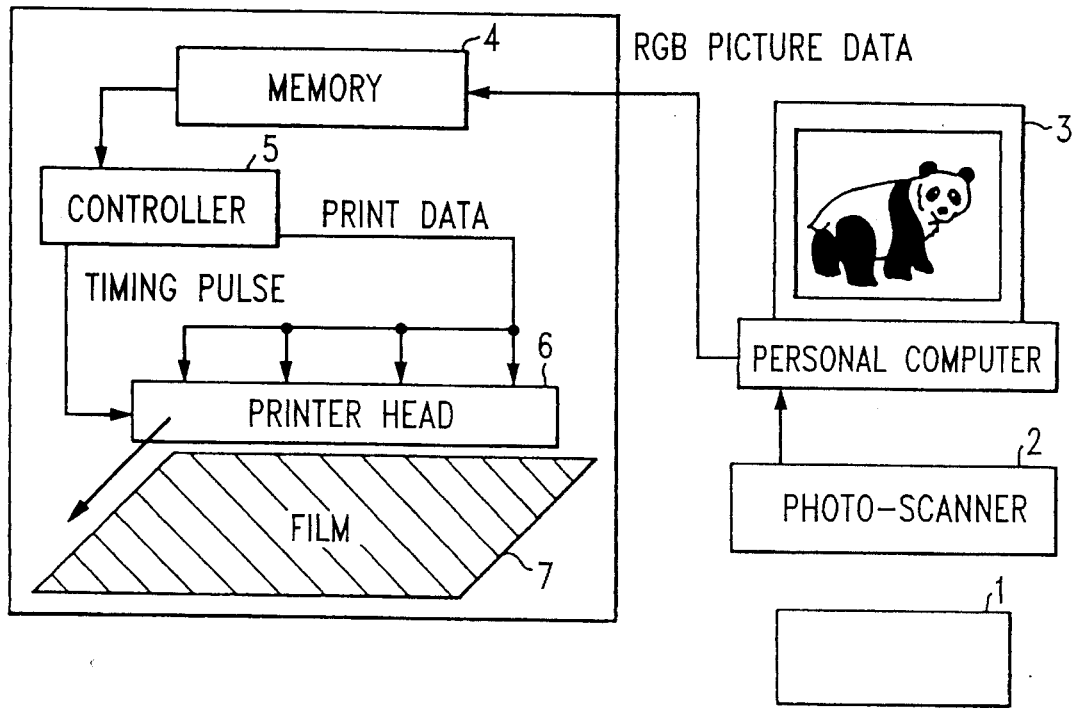
FIG. 3 is a block diagram illustrating a concrete example of a color printing system employing the liquid crystal shutter array of the present invention.

Described below first with reference to FIG. 3 is the structure of a color printing system using the color liquid crystal shutter array according to the present invention. That is, as is obvious with reference to FIG. 3, the picture data of an original color picture 1 are digitized by a photo-scanner 2 or the like and are input into a personal computer as full-color picture data which are then stored in a static RAM 4 as picture data of R, G and B colors of 8 bits for each of the pixels.

Here, 8-bit digital data of R, G and B colors constituting a pixel displays any gradation among 256 gradations.

A controller circuit 5 outputs a timing waveform which is formed after each time for writing onto a row of pixels and a picture print data of a selected row of pixels. The above timing signal and the data signals are successively sent for each of the rows of pixels to the printer head 6 that is moving at a predetermined speed until all of the picture data are output, and a full-color picture is formed on an instant film 7.

Figure 4:
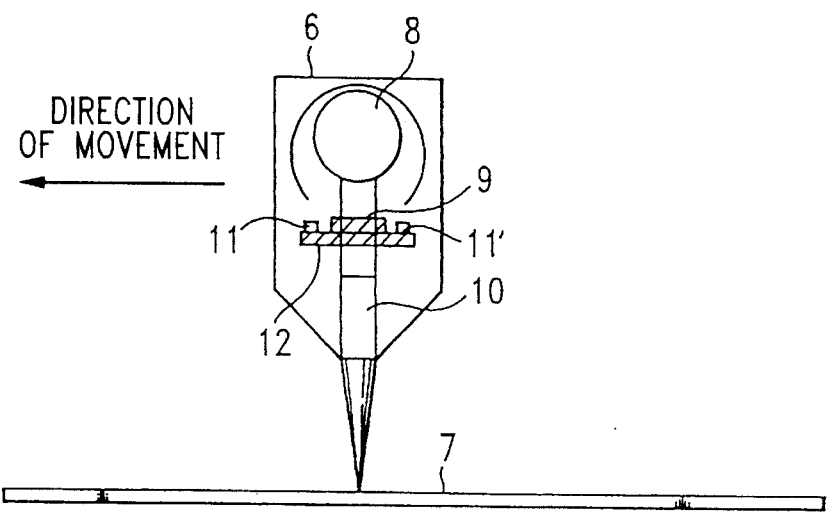
FIG. 4 is a sectional view which schematically illustrates an optical printer head using the color liquid crystal shutter array of the present invention.
Figure 5:
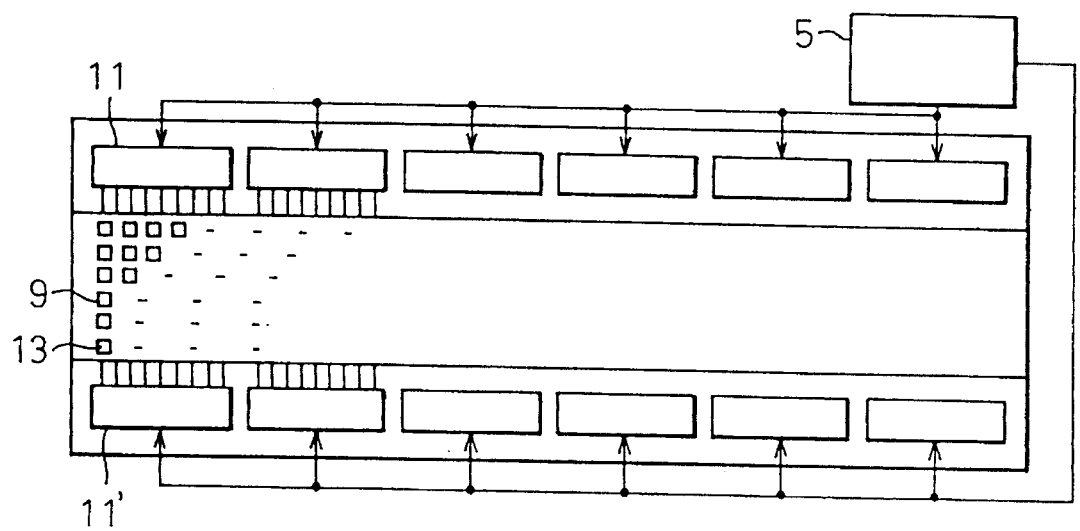
FIG. 5 is a plan view of the optical printer head using the color liquid crystal shutter array of the present invention.

FIG. 4 is a sectional view illustrating an embodiment of the printer head 6 used in the present invention, which comprises a shutter plate 12 having mounted thereon a color liquid crystal shutter array 9 in which a plurality of the color liquid crystal shutters are arrayed and further having mounted thereon drive circuits 11 and 11' made up of LSIs, or the like, for independently turning the color liquid crystal shutters on and off, a halogen source of light 8 disposed over the shutter plate 12, and a selfoc lens array 10 disposed under the shutter plate 12. FIG. 5 is a plan view of the shutter plate 12 of FIG. 4.

As will be obvious from FIG. 5, the color liquid crystal shutter array 9 consisting of an array of a plurality of color liquid crystal shutters 13 according to the present invention is disposed at the center of the shutter plate 12, and a plurality of drive circuits 11, 11' made up of LSIs, or the like, are arranged on both sides thereof to independently drive the plurality of the color liquid crystal shutters 13.

Wirings are connected in a predetermined shape from the drive circuits 11, 11' to the individual color liquid crystal shutters 13 that will be driven thereby.

When, for instance, there are 640 color pixels for each of the three primary colors to constitute a color liquid crystal shutter array 9, then there are a total of 1920 color liquid crystal shutters 13 in the color liquid crystal shutter array 9.

In such a case, when, for instance, one drive circuit 11 is capable of controlling 160 color liquid crystal shutters, then a total of 12 drive circuits 11 made up of LSIs or the like are necessary. Therefore, one-half, i.e., six drive circuits 11 are arranged on one side edge of the color liquid crystal shutter array 9 and the remaining six drive circuits 11' are arranged on the other side edge of the color liquid crystal shutter array 9 as shown in FIG. 5.

The drive circuits 11 and 11' are driven in response to predetermined control signals that contain gradation data of each of the pixels sent from a controller that is shown in FIG. 3.

Figure 6:
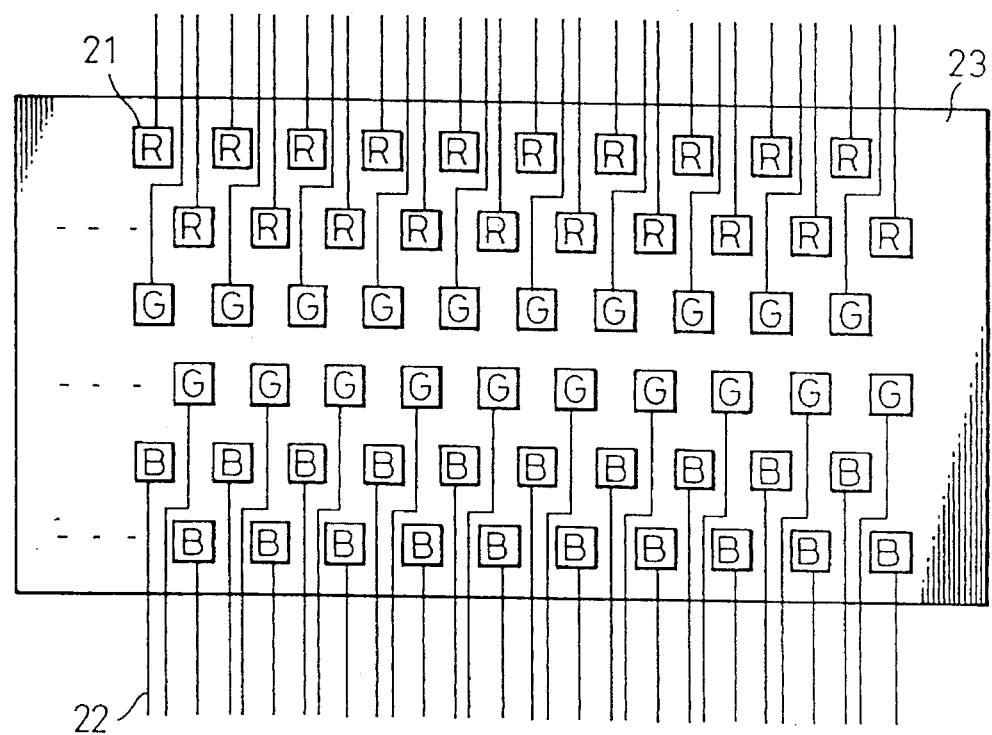
FIG. 6 is a schematic plan view illustrating the arrangement of pixels in a color liquid crystal shutter array according to a first embodiment of the present invention and the arrangement of lead electrodes drawn from the pixels.

FIG. 6 illustrates the constitution of the liquid crystal shutter array according to a first embodiment of the present invention. FIG. 6 is a plan view which schematically illustrates the arrangement of the liquid crystal shutter array having 640 color pixels 21 for each of the three primary colors according to the first embodiment of the present invention and the arrangement of part of the lead electrodes 22 drawn from the pixels. In FIG. 6, red pixels (R), green pixels (G) and blue pixels (B), having a size of 120 microns, are each arranged in two rows in a deviated manner and, hence, transparent electrically conducting lead electrodes 22 can be easily drawn running among the color pixels 21. Reference numeral 23 denotes an opposing electrode.

The lead electrodes 22 of pixels of the second and third rows are drawn passing through gaps among the pixels of the first row, and the lead electrodes 22 of pixels of the fourth and fifth rows are drawn passing through gaps among the pixels of the sixth row. Thus, the lead electrodes are efficiently and uniformly drawn in the upper and lower directions. The pixels of the sixth row are arranged maintaining a pitch of 240 microns.

Ferroelectric liquid crystal and super-twisted nematic liquid crystal were used for the color shutter array cells having the above-mentioned color pixel arrangement in order to fabricate a color liquid crystal shutter array. A compact optical printer head was fabricated by using the color liquid crystal shutter array 9, halogen source of light 8 and selfoc lens array 10 as shown in FIG. 4, and the color printing was attempted by moving the optical printer head and the 669 instant film 7 of Polaroid Co. at a predetermined speed relative to each other. Full-color printing of a high quality without stripes was obtained in three seconds.

Figure 7:
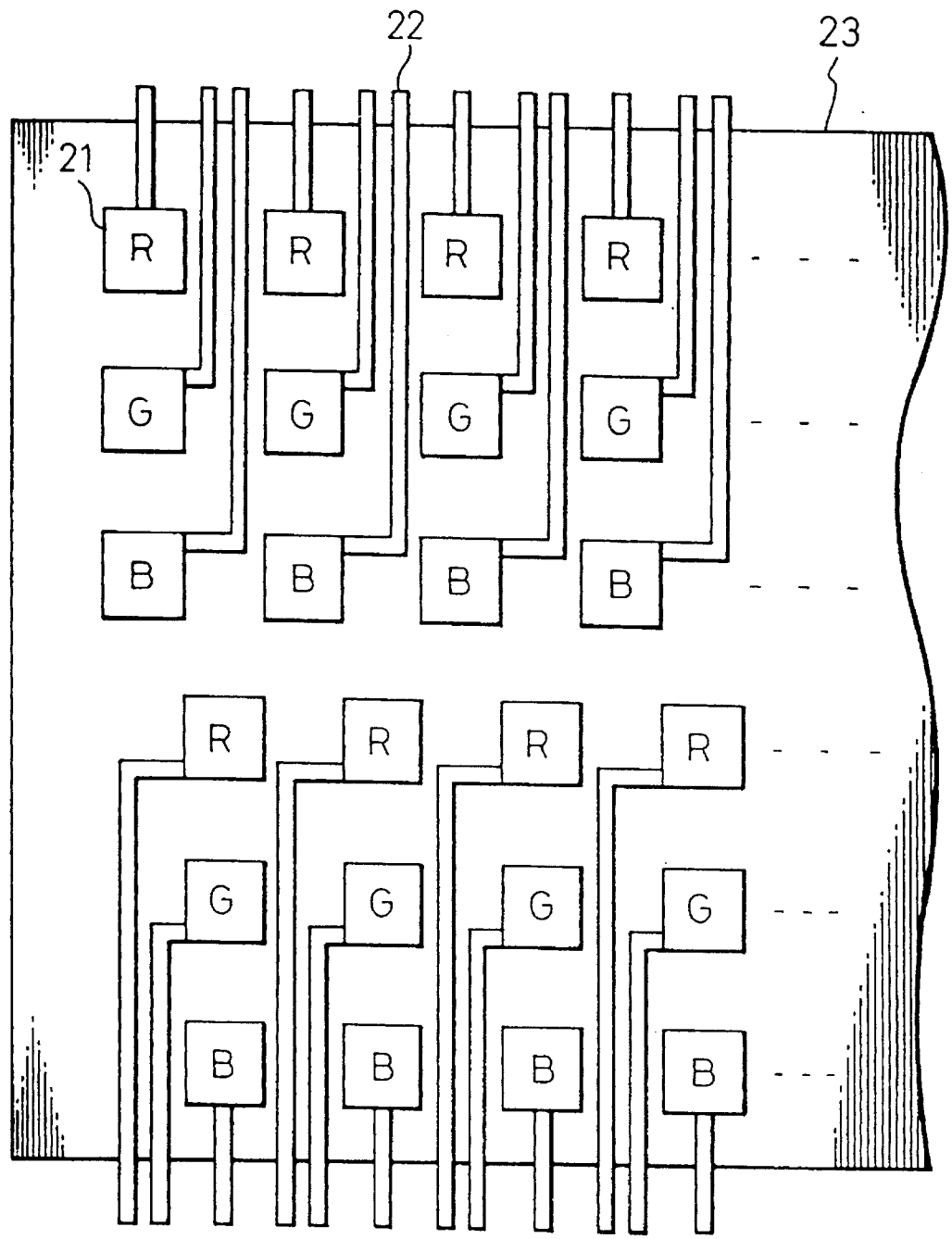
FIG. 7 is a schematic plan view illustrating the arrangement of pixels in a color liquid crystal shutter array according to a first embodiment of the present invention and the arrangement of lead electrodes drawn from the pixels.

FIG. 7 is a plan view of a second arrangement of the color liquid crystal shutters according to the present invention, and schematically illustrates the arrangement of the liquid crystal shutter array having 640 color pixels 21 for each of the three primary colors and the arrangement of part of the lead electrodes 22 drawn from the pixels. In FIG. 7, the red pixels (R), green pixels (G) and blue pixels (B) having a size of 120 microns are arranged in two rows for each of the colors, i.e., arranged in a total of six rows. Each row of pixels is deviated by a pitch of one pixel from the neighboring row of pixels, and the six rows of pixels are divided into two groups each including three rows neighboring each other. The lead electrodes are drawn in different directions depending upon the groups. Therefore, the lead electrodes 22 made of a transparent electrically conducting film can be easily drawn passing through gaps among the color pixels 21.

That is, the lead electrodes of pixels of the second and third rows are drawn passing through gaps among the pixels of the first row, and the lead electrodes of pixels of the fourth and fifth rows are drawn passing through gaps among the pixels of the sixth row. Thus, the lead electrodes are efficiently and uniformly drawn in the up and down directions. The pixels of the sixth row are arranged maintaining a pitch of 240 microns.

As described above, the color liquid crystal shutter array of the present invention has pixels arranged in two rows in a deviated manner for each of the colors, and the picture is printed without forming stripes that result from a gap among the pixels. Furthermore, the lead electrodes are independently drawn from the individual color pixels by utilizing gaps of a width of one pixel among the pixels, making it possible to constitute a color shutter array that can be driven in a static manner to exhibit characteristics of the liquid crystal elements to a sufficient degree. It is therefore made possible to provide a color liquid crystal shutter array which helps realize a compact color printing head that effects printing of high quality on a photosensitive paper within short periods of time. This makes it possible to provide the optical color printer at a reduced cost, with a compact size, and with high quality.

Described below is a method of driving the color liquid crystal shutter array of the present invention.

Figure 8A:
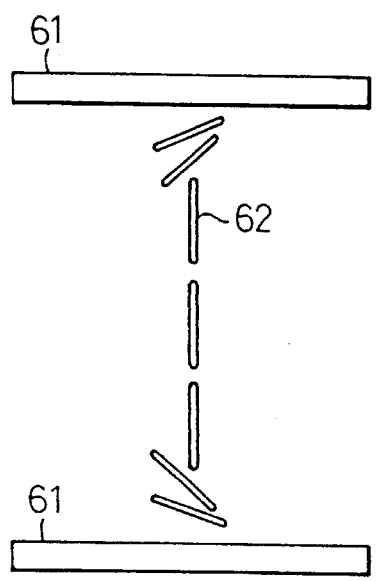
FIGS. 8(a) and 8(b) are diagrams which schematically illustrate the arrangement of liquid crystal molecules in a liquid crystal element.
Figure 8B:
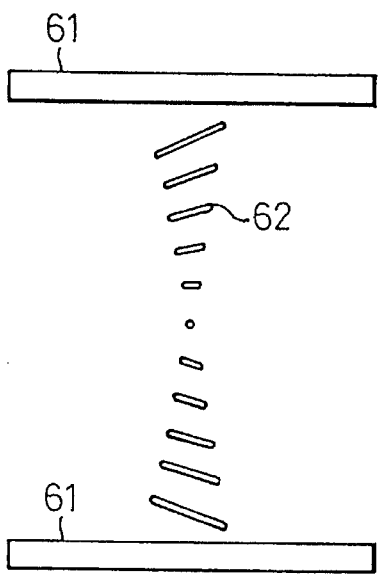

The operation of the liquid crystal shutter will be described first. Referring to FIGS. 8(a) and 8(b), the nematic liquid crystal to which a chiral dopant is added is sandwiched by two glass substrates 61 having a transparent electrode to constitute a liquid crystal cell which is then sandwiched by a pair of polarizer plates which are so arranged that the axes of absorption thereof are at right angles to each other, to thereby constitute a positive-type super-twisted nematic liquid crystal shutter. Under the condition of FIG. 8(B) where no voltage is applied, the bright level is selected due to the double refraction of the liquid crystal molecules 62 which are in the twisted condition. In the condition of FIG. 8(B) where a voltage is applied, most of the liquid crystal molecules are arranged perpendicularly to the glass substrate 61 having transparent electrode and there will be obtained the dark level with the polarizer plate being closed.

When the applied voltage is not sufficiently great, however, the liquid crystal molecules near the glass substrates are not completely erected as shown in FIG. 8(a), permitting the transmission factor of the selected dark level to increase. In particular, the contrast ratio drastically decreases even by a small of amount of transmission light in the dark level. Therefore, a sufficiently large voltage must be applied to the liquid crystal elements. According was found that most of the positive-type super-twisted nematic liquid crystals having a liquid crystal layer thickness of about 5 microns and a twist angle of 180 degrees to 270 degrees reached a saturation value of a contrast ratio of greater than 100 by the application of a drive voltage of greater than 30 volts which was more than twice as great as the drive voltage output by an ordinary CMOS-LSI.

Therefore, the ordinary super-twisted nematic liquid crystal elements exhibit various colors under the condition where no voltage is applied since the display is accomplished by utilizing the effect of double refraction. The color is roughly given by the following relation, $$T = \sin^2(\pi \Delta n d / 2\lambda)$$

where,

T: light transmission factor, $\Delta n$: anisotropy of refractive index of liquid crystal molecules, d: thickness of liquid crystal layer, $\lambda$: wavelength.

That is, the liquid crystal element is colored in yellow when the value $\Delta n d$ is 0.9, colored in green when the value is 0.8 and is colored in blue when the value is 0.6. The liquid crystal element is colored little as the value becomes smaller than 0.35 lending itself well to being used as a liquid crystal shutter. Here, the above-mentioned colored state can be changed not only by changing the value $\Delta n d$ inherent in the liquid crystal element but also by changing the arrangement of liquid crystal molecules by applying a voltage to the liquid crystal element.

Figure 9:
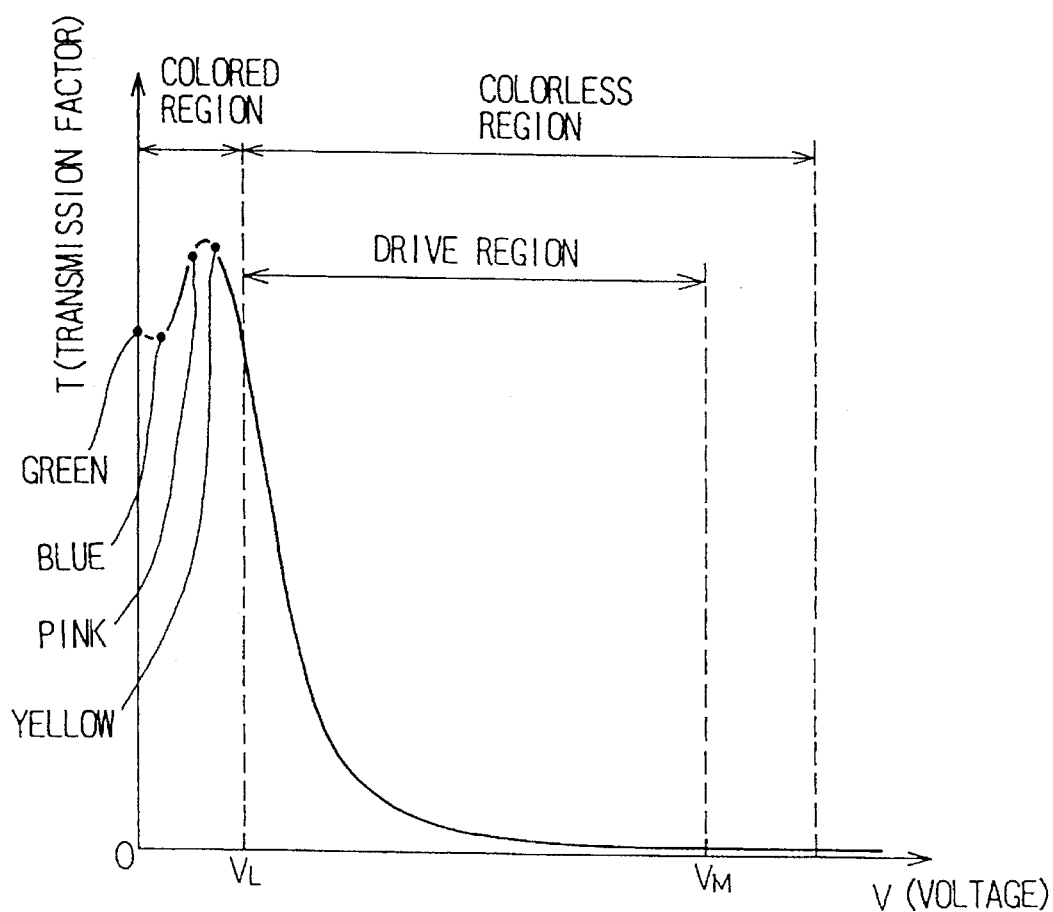
FIG. 9 is a curve of voltage vs. transmission factor of the liquid crystal element.

FIG. 9 is a curve of voltage vs. transmission factor representing the colored condition of a typical positive-type super-twisted nematic liquid crystal element. As will be obvious from FIG. 9, the hue drastically changes as green-pink-yellow-pale yellow from where no voltage is applied to a point of applying the voltage VL. As the voltage further increases, however, the hue remains colorless and the transmission factor only continues to decrease. The transmission factor nearly reaches a saturation level at the voltage VM. Experiments using a polarization microscope revealed that the voltage VL was from 3 to 5 volts with the AC drive of 10 KHz, the voltage VM was from 30 to 40 volts and the transmission factor at this moment was smaller than 0.5%.

Therefore, when the bright level is selected at the voltage VL and the dark level is selected at the voltage VM, the liquid crystal shutters can be driven maintaining a contrast ratio of as high as 100 or more without being colored, making it possible to effect full-color printing of high quality having a vivid hue on a photosensitive paper such as an instant film.

Figure 10:
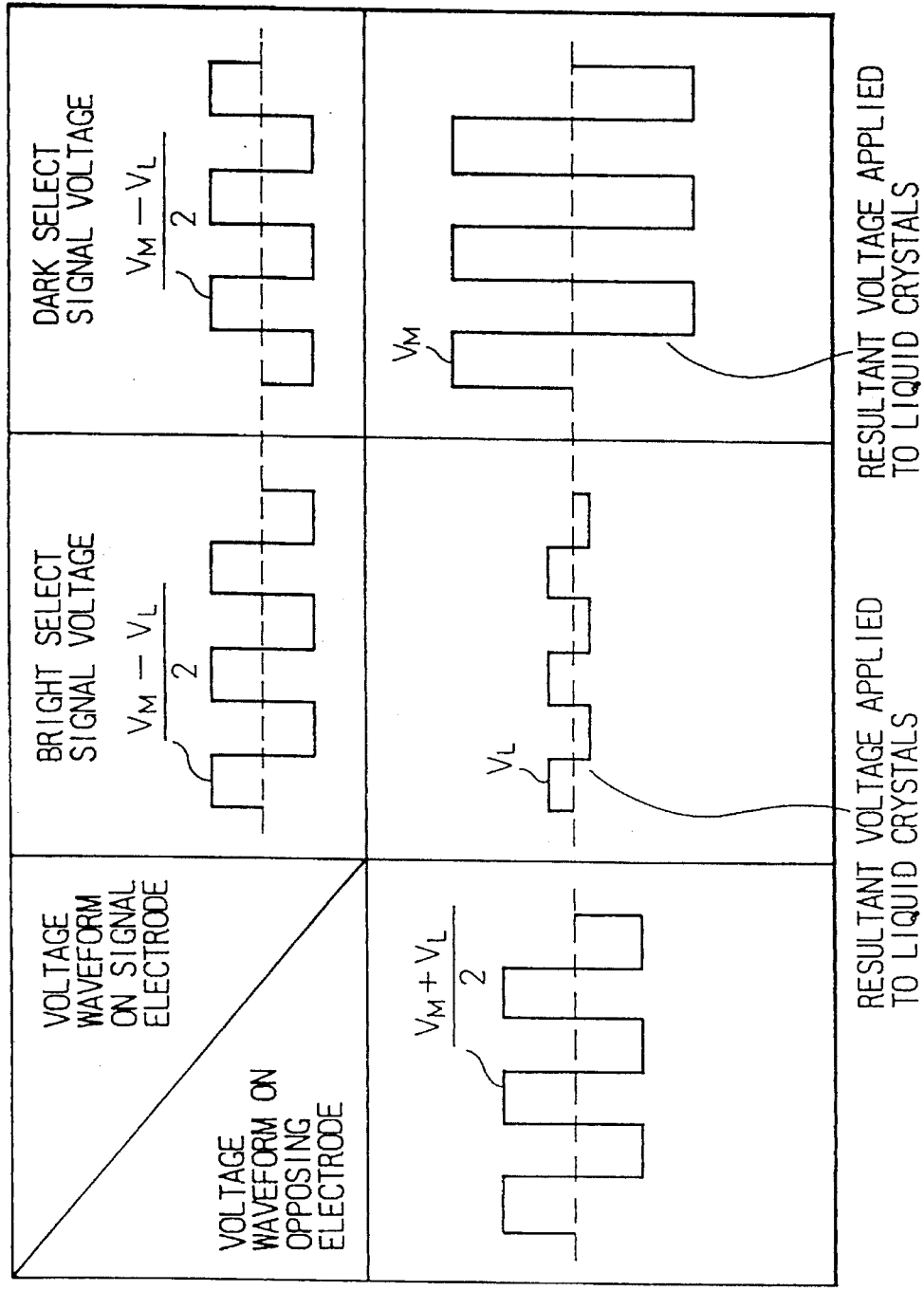
FIG. 10 is a diagram explaining the method of driving the liquid crystal shutter according to the present invention.

The present inventors have studied the method of driving liquid crystal shutters based on the above-mentioned knowledge and have arrived at an embodiment of the present invention which is described below. FIG. 10 is a diagram explaining a method of driving the positive-type super-twisted nematic liquid crystal shutters of the present invention, wherein the white level is selected by applying an AC voltage waveform to the signal electrodes and an AC voltage waveform to the opposing electrode having phases in agreement with each other, and the black level is selected by applying an AC voltage waveform to the signal electrodes and an AC voltage waveform to the opposing electrode having phases inverted relative to each other, the AC voltage applied to the opposing electrode being greater than the AC voltage applied to the signal electrodes by a value VL with which the color of the liquid crystal shutters can be extinguished, and the sum of the AC voltage applied to the opposing electrode and the AC voltage applied to the signal electrodes being so selected as will be nearly in agreement with a saturation voltage VM that minimizes the transmission factor of the liquid crystal shutters.

Therefore, the resultant voltage for selecting the bright level applied to the pixels of liquid crystal shutters becomes the voltage VL with which the transmission of light becomes the greatest within a range in which no color develops, and the resultant voltage for selecting the dark level becomes the voltage VM that minimizes the transmission of light. Thus, the driving method of the present invention makes it possible to accomplish the switching maintaining a nearly flat transmission spectrum within a region of visible light and a high contrast ratio. For instance, with the positive-type super-twisted nematic liquid crystal shutter having a twist angle of 225 degrees and $\Delta n d = 1.02$, the value VL is about 4 volts and the value VM is about 32 volts. When the liquid crystal shutters were driven with AC pulses of 10 KHz while setting $(32-4)/2 = 14$ volts for the signal electrodes and setting $(32+4)/2 = 18$ volts for the opposing electrode, a contrast ratio of 120 was obtained and the voltage applied to the signal electrodes could be confined within a range of the drive voltage of the CMOS-LSI.

Next, gelatine filters of R (red), G (green) and B (blue) were provided on the inside of the glass substrates of the liquid crystal shutters to fabricate a color liquid crystal shutter array having a resolution of 200 dpi. As shown in FIG. 6, the color pixels 21 in the color liquid crystal shutter array were arranged in a deviated manner and the electrodes 22 were drawn from the individual pixels. Therefore, the color liquid crystal shutter array could be driven in a static manner by utilizing the driving method of the present invention.

FIG. 4 is a sectional view which schematically illustrates a color liquid crystal printer head 6 for forming full-color pictures and in which are incorporated the above-mentioned color liquid crystal shutter array 9, a source of white light 8 such as a fluorescent lamp or a halogen lamp, and a selfoc lens array 10 for focusing the modulated light on an instant film 7. A full-color picture was printed by moving the color liquid crystal printing head on Polaroid 669 instant film at a speed of 32 mm/sec. for 2.4 seconds.

Figure 11A:
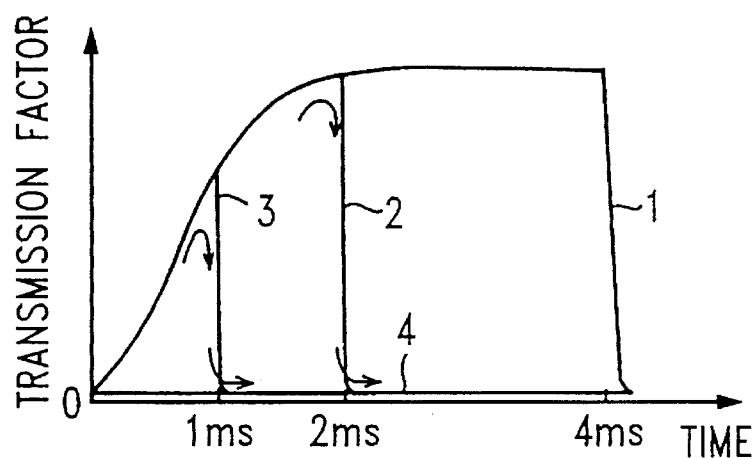
FIGS. 11(a) and 11(b) are diagrams explaining the gradation control by the driving method of the present invention.
Figure 11B:
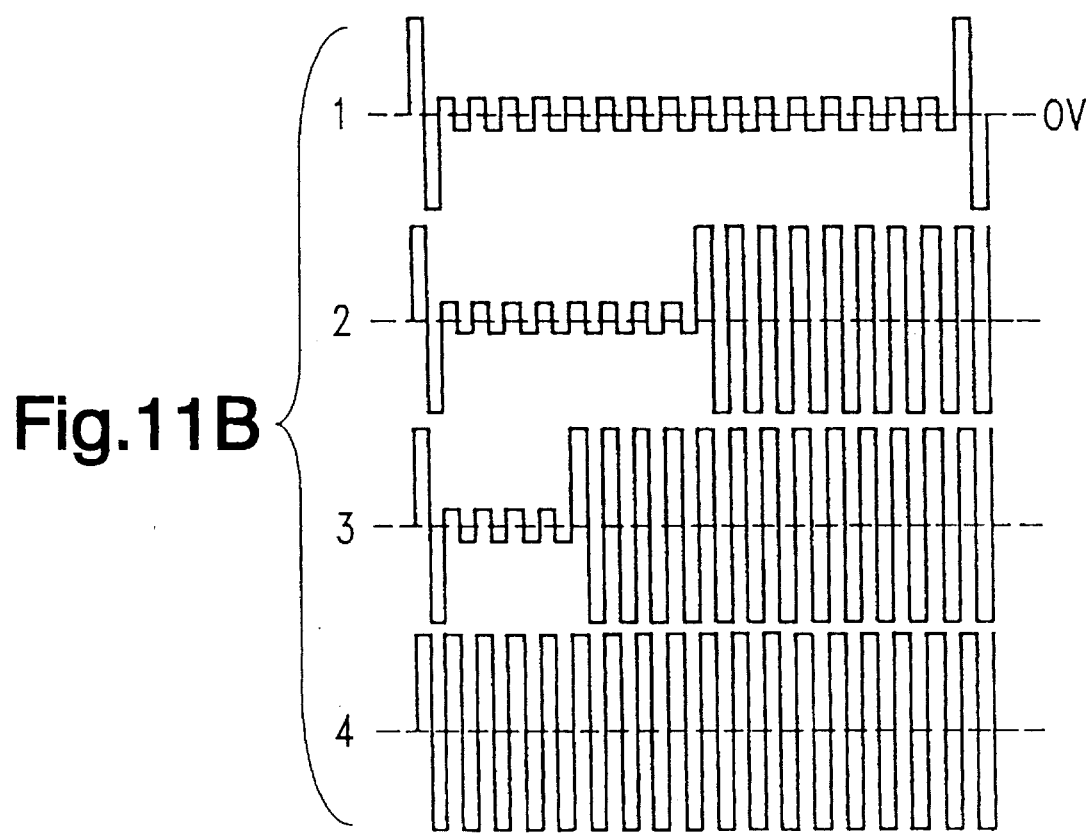

FIGS. 11(a) and 11(b) illustrates the driving with gradation for obtaining a full-color picture. A transmission factor curve of FIG. 11(A) shows transmission factor levels (1), (2), (3) and (4). FIG. 11(B) shows voltage waveforms applied across the electrodes of the liquid crystal pixels to obtain such transmission factors, the numbers of the voltage waveforms corresponding to those of FIG. 11(A). The color pixels of 200 dpi (having a size of 128 microns) of the liquid crystal shutters are continuously modulated to assume (1) the bright level, (2) and (3) the intermediate level, and (4) the dark level within a selection time of 4 milliseconds.

The driving with 64 continuous gradations was carried out in compliance with the above-mentioned method, and a vivid printing of high quality could be obtained on the instant film within a period of time which is as short as three seconds or less. That is, with the method of driving the color liquid crystal shutter array 9 of the present invention, the drive circuits 11, are made up of LSIs, or the like as described earlier and can be driven with a voltage of about 12 volts at the greatest.

The drive circuits 11, made up of LSIs, are broken if a voltage of about 24 V is applied thereto at which the color liquid crystal shutters exhibit the smallest light transmission factor. That is, the voltage of about 24 V cannot be applied to the drive circuits 11. According to the present invention, therefore, the signal electrodes of the liquid crystal pixels are supplied with a voltage (VM–VL)/2 that corresponds to one-half the difference between the electrode voltage VL at which the color of the liquid crystal pixels extinguishes and the electrode voltage VM at which the transmission factor of the liquid crystal pixels becomes the smallest. And further the opposing electrodes thereof are supplied with a voltage (VM+VL)/2 that corresponds to one-half the sum between above-mentioned voltages VL and VM. Moreover, the phases are deviated by 180 degrees between the AC voltage for selecting the bright level and the AC voltage for selecting the dark level. In selecting the dark level, in particular, a voltage which is apparently higher than the breakdown voltage of the drive circuits 11 is generated in the liquid crystals.

According to the present invention, the drive circuits 11 have a function for selecting the bright level and the dark level of the liquid crystal pixels in the colorless region of the liquid crystals.

As described above by way of embodiments, the present invention makes it possible to drive the positive-type super-twisted nematic liquid crystal shutters maintaining a contrast ratio of greater than 100 without being colored even by using a low-voltage CMOS-LSI and, hence, provides a compact color liquid crystal printer head of a low cost which is capable of effecting a full-color printing having a vivid hue on a photosensitive paper such as an instant film within short periods of time.

I claim:

1. A color liquid crystal shutter array, comprising color pixels of a plurality of colors constituted by liquid crystal elements for optically writing a picture onto a photosensitive paper, the pixels being arranged in two rows for each of the colors in a direction at right angles to the direction in which the photosensitive paper moves, the pixels of each of the rows being spaced apart maintaining a pitch equal to the size of the pixel, the rows of pixels of the same color being deviated by one pitch relative to each other in the direction in which the pixels are arranged, and lead electrodes of the pixels extending between the pixels in the direction in which the photosensitive paper moves.

2. A color liquid crystal shutter array according to claim 1, wherein the color pixels are arranged in a total of six rows consisting of two rows for each of red color, green color and blue color pixels, each of the rows of pixels being deviated by a pitch of a pixel relative to the neighboring rows of pixels, the six rows of pixels being divided into two groups, each group including three rows of pixels, and lead electrodes extending in directions that differ depending upon the group with which the lead electrodes are associated.

3. A color liquid crystal shutter array according to claim 1, wherein the color pixels are arranged in a total of six rows consisting of two rows for each of red color, green color and blue color pixels the total of six rows being divided into two groups, each group including three rows of pixels of red color, green color and blue color, the pixels being arranged the same in each of the groups with each group being deviated by one pitch relative to the pixels of the other group, and lead electrodes extending in directions that differ depending upon the group with which the lead electrodes are associated.

4. A color liquid crystal shutter array according to any one of claims 1 to 3, comprising positive-type super-twisted nematic liquid crystal elements.

5. A color liquid crystal shutter array according to claim 4, comprising a control circuit which selects a bright level and a dark level of the liquid crystal pixels within a colorless region of said liquid crystal elements.

6. A color liquid crystal shutter array according to claim 5, wherein said lead electrodes include signal electrodes, and wherein said control circuit applies to the signal electrodes of said liquid crystal pixels a voltage that corresponds to one-half the difference between a first electrode voltage at which the color of the liquid crystal pixels extinguishes and a second electrode voltage which minimizes the transmission factor of the liquid crystal pixels, and further applies to an opposing electrode of said liquid crystal pixels a voltage that corresponds to one-half the sum of the first and second electrode voltages.

7. A method of driving a liquid crystal shutter array for controlling the amount of light that transmits through the liquid crystal pixels, comprising the steps of;

applying a first AC voltage, having a peak value corresponding to an expression (VL+VM)/2, to one of the opposing electrode of positive-type super twisted nematic liquid crystal cells and to signal electrodes;

applying a second AC voltage, having a peak value corresponding to an expression (VL–VM)/2, to the other of the opposing electrode and the signal electrodes, wherein VL is an inter-electrode voltage at which the color of the liquid crystal pixels starts to extinguish and VM is an inter-electrode voltage that minimizes the transmission factor of the liquid crystal pixels;

selecting a bright level by applying the first and second AC voltages in phase with one another; and selecting a dark level by applying the first and second AC voltages in phase opposition to one another.

8. A method of driving a liquid crystal shutter array according to claim 7, comprising changing the ratio of a period of selecting the bright level to a period of selecting the dark level of the pixels during a selection period for one pixel to control the gradation.

\* \* \* \* \*

UNITED STATES PATENT AND TRADEMARK OFFICE
CERTIFICATE OF CORRECTION

PATENT NO. : 5,548,423

DATED : August 20, 1996

INVENTOR(S) : MATSUNAGA

It is certified that error appears in the above-indentified patent and that said Letters Patent is hereby corrected as shown below:

Inventor, Title Page (Both Occurrences) change "Natsunaga" to --Matsunaga--.

Signed and Sealed this

Eighteenth Day of February, 1997

Attest:

BRUCE LEHMAN

*Attesting Officer*   *Commissioner of Patents and Trademarks*